United States Patent
Allen et al.

(10) Patent No.: US 8,265,614 B2
(45) Date of Patent: *Sep. 11, 2012

(54) SYSTEM AND METHOD FOR INTEGRATING AN OUTGOING CELLULAR CALL AS AN ENTERPRISE CALL

(75) Inventors: Andrew Allen, Mundelein, IL (US); Adrian Buckley, Tracy, CA (US); Richard George, Waterloo (CA); Brian Oliver, Fergus (CA); Lap Luu, Markham (CA); Dalsu Lee, Thornhill (CA)

(73) Assignee: Research In Motion Limited, Waterloo (CA)

( * ) Notice: Subject to any disclaimer, the term of this patent is extended or adjusted under 35 U.S.C. 154(b) by 1224 days.

This patent is subject to a terminal disclaimer.

(21) Appl. No.: 11/796,915

(22) Filed: Apr. 30, 2007

(65) Prior Publication Data

US 2008/0268825 A1    Oct. 30, 2008

(51) Int. Cl.
*H04M 3/42*    (2006.01)
(52) U.S. Cl. ........ 455/415; 455/445; 455/466; 370/352; 370/356
(58) Field of Classification Search .................. 455/415, 455/428, 445, 466, 554.1–555; 370/338, 370/412, 413, 428, 429, 351–356
See application file for complete search history.

(56) References Cited

U.S. PATENT DOCUMENTS

| | | | |
|---|---|---|---|
| 7,260,385 B2 * | 8/2007 | Heinmiller et al. | 455/415 |
| 7,496,360 B2 * | 2/2009 | Sindhwani et al. | 455/422.1 |
| 7,515,905 B2 * | 4/2009 | Begeja et al. | 455/417 |
| 7,539,492 B2 * | 5/2009 | Jagadeesan et al. | 455/436 |
| 7,627,101 B2 * | 12/2009 | Chang et al. | 379/198 |
| 7,817,012 B2 * | 10/2010 | Ehlinger et al. | 340/5.2 |
| 7,903,635 B2 * | 3/2011 | Silver et al. | 370/351 |
| 7,965,997 B2 * | 6/2011 | Sposato et al. | 455/406 |
| 8,000,710 B2 * | 8/2011 | Jagadeesan et al. | 455/436 |

(Continued)

FOREIGN PATENT DOCUMENTS

EP    0582440 A2    9/1994

(Continued)

OTHER PUBLICATIONS

European Search Report; European Patent Office; Nov. 7, 2007; 8 pages.

(Continued)

*Primary Examiner* — Sharad Rampuria
(74) *Attorney, Agent, or Firm* — The Danamraj Law Group, P.C.

(57) ABSTRACT

In one embodiment, a network node is operable, responsive to receiving a request from an enterprise user to initiate origination of an outgoing cellular call to a called party, for establishing a first call leg to the enterprise user by sending a circuit-switched call that identifies an enterprise address of the enterprise user as a calling line identity. The network node includes functionality for establishing a second call leg to the called party upon receiving an indication from the enterprise user that the first call leg has been established. The first and second call legs are then patched to establish an end-to-end communications path between the enterprise user and the called party, wherein the enterprise address instead of the non-enterprise address is presented to the called party as a calling line identity with respect to the outgoing cellular call from the enterprise user.

16 Claims, 5 Drawing Sheets

U.S. PATENT DOCUMENTS

| | | | |
|---|---|---|---|
| 8,000,712 B2* | 8/2011 | Gisby et al. | 455/445 |
| 8,107,464 B2* | 1/2012 | Schmidt et al. | 370/352 |
| 2002/0019246 A1* | 2/2002 | Forte | 455/555 |
| 2002/0089998 A1 | 7/2002 | Le | |
| 2003/0002476 A1 | 1/2003 | Chung et al. | |
| 2004/0196867 A1 | 10/2004 | Ejzak et al. | |
| 2006/0030357 A1* | 2/2006 | McConnell et al. | 455/554.1 |
| 2006/0034336 A1* | 2/2006 | Huh et al. | 370/498 |
| 2006/0080407 A1 | 4/2006 | Rengaraju | |
| 2006/0294245 A1 | 12/2006 | Raguparan et al. | |
| 2007/0015535 A1 | 1/2007 | LaBauve et al. | |
| 2007/0091830 A1 | 4/2007 | Coulas et al. | |
| 2007/0146475 A1 | 6/2007 | Inoue | |
| 2007/0204065 A1 | 8/2007 | Harton et al. | |
| 2007/0293220 A1 | 12/2007 | Mahler et al. | |
| 2008/0125123 A1 | 5/2008 | Dorenbosch et al. | |
| 2008/0144637 A1 | 6/2008 | Sylvain et al. | |
| 2008/0267170 A1 | 10/2008 | Allen | |
| 2008/0268824 A1 | 10/2008 | Allen | |
| 2009/0312026 A1* | 12/2009 | Parameswar | 455/445 |

FOREIGN PATENT DOCUMENTS

| | | |
|---|---|---|
| EP | 1531635 A1 | 5/2005 |
| EP | 1675413 | 6/2006 |
| GB | 2342536 A | 12/2000 |
| WO | 2004077796 A2 | 9/2004 |

OTHER PUBLICATIONS

Dutta, A. et al.; "Flexible Call Control Framework Supporting Multi-party Service"; Columbia University; 7 pages.

European Search Report; European Patent Office; Nov. 2, 2007; 9 pages.

Devriendt, J. et al.; "Network Migration Strategies towards IMS"; Strategy White Paper; Alcatel; 9 pages.

European Search Report; European Patent Office; Oct. 15, 2007; 7 pages.

European Communication Examination Report, Application No. 07107246.6, European Patent Office, Jul. 27, 2010, 4 pgs.

Canadian Office Action, Application No. 2,630,097, Canadian Intellectual Property Office, Sep. 13, 2010, 2 pgs.

Chinese Office Action, Application No. 2008-10210302.6, Chinese IPO, Aug. 12, 2010, 5 pgs.

European Communication Examination Report, Application No. 07107244.1, European Patent Office, Apr. 8, 2010, 4 pgs.

"Interworking zwischen dem IMS Messagingservice und SMS oder MMS" IP.COM Journal, IP.COM Inc., West Henrietta, NY, US, Oct. 10, 2006, XP013116018ISSN: 1533-001, (English Translation), 3 pgs.

European Communication Examination Report, Application No. 07107248.2, European Patent Office, Feb. 2, 2010, 4 pgs.

SIPO, Office Action, Application No. 200810210302.6, Jan. 31, 2012, 7 pgs.

USPTO, Office Action, U.S. Appl. No. 11/796,804, Mar. 7, 2012, 11 pgs.

SIPO, Office Action, Application No. 20081018871.5, Aug. 3, 2011, 8 pgs.

USPTO, Office Action, U.S. Appl. No. 11/796,804, Oct. 26, 2011, 13 pgs.

ZTE Technologies, IMS Special issue, vol. 9, No. 3, Issue 86, Mar. 2007, 32 pgs.

CIPO, Office Action, Application No. 2630101, Feb. 28, 2011, 5 pgs.

CIPO, Office Action, Application No. 2630130, Feb. 25, 2011, 4 pgs.

EPO, Communication Pursuant to Article 94(3) EPC, Application No. 07107244.1, Apr. 8, 2010, 4 pgs.

SIPO, Office Action, Application No. 200810210303.0, Apr. 22, 2011, 2 pgs.

USPTO, Office Action, U.S. Appl. No. 11/796,804, Mar. 17, 2011, 15 pgs.

USPTO, Office Action, U.S. Appl. No. 11/796,827, Feb. 8, 2010, 12 pgs.

USPTO, Office Action, U.S. Appl. No. 11/796,827, Jul. 20, 2010, 13 pgs.

USPTO, Office Action, U.S. Appl. No. 11/796,827, Nov. 29, 2010, 17 pgs.

USPTO, Office Action, U.S. Appl. No. 11/796,827, Apr. 26, 2011, 14 pgs.

SIPO, Office Action, Application No. 200810210303.0, Mar. 19, 2012, 7 pgs.

SIPO, Rejection Decision, Application No. 200810188751.5, Jul. 9, 2012, 2 pgs.

CIPO, Office Action, Application No. 2630101, Jul. 12, 2012, 4 pgs.

CIPO, Office Action, Application No. 2630130, Jul. 12, 2012, 3 pgs.

SIPO, Office Action, Application No. 200810210303.0, Jul. 11, 2012, 4 pgs.

* cited by examiner

SYSTEM AND METHOD FOR INTEGRATING AN OUTGOING CELLULAR CALL AS AN ENTERPRISE CALL

CROSS-REFERENCE TO RELATED APPLICATION(S)

This application discloses subject matter that is related to the subject matter of the following U.S. patent application(s): (i) "SYSTEM AND METHOD FOR PRESENTING MEDIA TO MULTIPLE PARTIES IN A SIP ENVIRONMENT", application Ser. No. 11/796,804, now published as U.S. Patent Publication No. 20080267170; and (ii) "SYSTEM AND METHOD FOR INTEGRATING AN OUTGOING CELLULAR CALL AS AN ENTERPRISE CALL IN AN IMS ENVIRONMENT", application Ser. No. 11/796,827, now published as U.S. Patent Publication No. 20080268824, which is (are) hereby incorporated by reference.

FIELD OF THE DISCLOSURE

The present patent disclosure generally relates to communications networks. More particularly, and not by way of any limitation, the present patent disclosure is directed to a system and method for integrating an outgoing cellular call as an enterprise call in a network environment.

BACKGROUND

Many enterprise networks are replacing their existing Private Branch Exchange (PBX)- and Central Office Exchange (CENTREX)-based telephony systems with systems based upon Voice-over-IP (VoIP) and Session Initiation Protocol (SIP)-based signaling systems that utilize the existing enterprise IP infrastructure, e.g., Local Area Network (LAN) and Wireless LAN (WLAN) technologies. It is not uncommon for enterprise employees to regularly use mobile communications devices when away from the enterprise, which interoperate with cellular networks such as, e.g., the Global System for Mobile Communications (GSM) networks, Code Division Multiple Access (CDMA) networks, and Universal Mobile Telecommunications System (UMTS) networks, to keep in touch with other employees of the enterprise and to conduct business communications with other people outside the enterprise. Additionally, mobile communications devices are being enhanced to provide SIP-based communications (including VoIP) over WLAN access as well as cellular networks, thereby allowing these devices to provide mobile telephony communications capability when within the enterprise as well as when away from the enterprise. It is expected that such developments may allow replacement of the ubiquitous wired desktop phone in the enterprise with dual-mode, WLAN-capable mobile devices.

Although cellular telephony networks have deployed IP-based data communications capabilities through exploitation of well-known technologies, it is generally understood that these networks cannot currently commercially support carrier-class VoIP telephony services due to issues of delay, Quality of Service (QoS) and efficiency, which prevent cost-effective usage of such networks for purposes of providing acceptable quality voice services. Accordingly, for the foreseeable future, telephony services based upon the existing network infrastructure are likely to continue to utilize conventional circuit-switched network technology for telephony calls.

Based on the foregoing, it should appreciated that the integration of VoIP enterprise networks with carrier cellular telephony networks in order to serve an enterprise user within the enterprise as well as while away is fraught with numerous difficulties. Moreover, in such scenarios it may be desirable for enterprises to have certain control over the calls made by their employees for tracking and monitoring purposes.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

The present patent disclosure is broadly directed to a scheme for integrating an outgoing cellular call as an enterprise call wherein an enterprise user's enterprise address is presented to the called party instead of the enterprise user's non-enterprise address (e.g., cellular telephony number). In one aspect, disclosed herein is an embodiment of a method for facilitating integration of an outgoing cellular call as an enterprise call, wherein the outgoing cellular call is originated by an enterprise user towards a called party when the enterprise user is attached to an external wide area cellular network via a mobile communications device, the enterprise user having an enterprise address and a non-enterprise address. The claimed embodiment comprises: sending a request to a network node for initiating the outgoing cellular call to the called party with an expectation to receive an incoming circuit-switched call back from the network node within a time window; receiving the incoming circuit-switched call from the network node and identifying that the incoming circuit-switched call contains the enterprise address as a calling line identity; correlating that the incoming circuit-switched call is related to the request to initiate origination of the outgoing cellular call; and providing an indication to the network node (which could be optional in some embodiments) that a call leg is established between the enterprise user and the network node.

In another aspect, disclosed herein is an embodiment of a method for integrating an outgoing cellular call as an enterprise call by an enterprise user having an enterprise address and a non-enterprise address. The claimed embodiment comprises: receiving a request from the enterprise user for initiating the outgoing cellular call to the called party; establishing a first call leg to the enterprise user by sending a circuit-switched call that identifies the enterprise address as a calling line identity; establishing a second call leg to the called party, preferably upon receiving an indication that the first call leg has been established; and patching the first and second call legs to establish an end-to-end communications path between the enterprise user and the called party, wherein the enterprise address is presented instead of the non-enterprise address to the called party as a calling line identity with respect to the outgoing cellular call from the enterprise user.

In a further aspect, disclosed herein is an embodiment of a user equipment (UE) device operable to generate an outgoing cellular call as an enterprise call to a called party. The claimed embodiment comprises: means for sending a request to a network node to initiate origination of the outgoing cellular call to the called party with an expectation to receive an incoming circuit-switched call back from the network node within a time window; and means for correlating that the incoming circuit-switched call is related to the request to initiate origination of the outgoing cellular call by identifying that the incoming circuit-switched call contains an enterprise address of the enterprise user as a calling line identity.

In a still further aspect, disclosed herein is an embodiment of a network node for integrating an outgoing cellular call as an enterprise call. The claimed embodiment comprises: means, responsive to receiving a request from the enterprise user to initiate origination of the outgoing cellular call to the called party, for establishing a first call leg to the enterprise user by sending a circuit-switched call that identifies the enterprise address as a calling line identity; means for establishing a second call leg to the called party upon receiving an indication from the enterprise user that the first call leg has been established; and means for patching the first and second call legs to establish an end-to-end communications path between the enterprise user and the called party, wherein an enterprise address of the enterprise user instead of its non-enterprise address is presented to the called party as a calling line identity with respect to the outgoing cellular call from the enterprise user.

Figure 1:
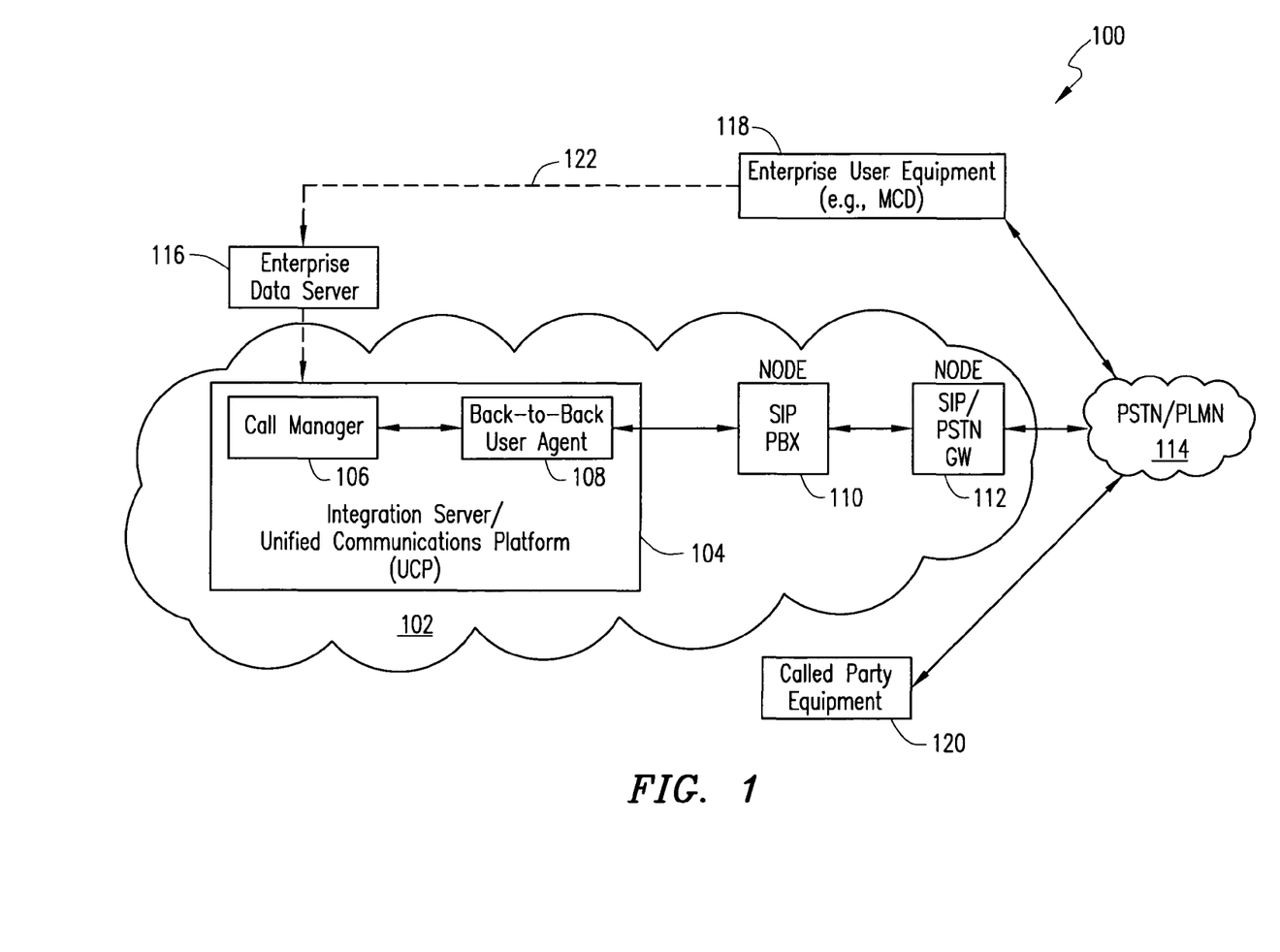
FIG. 1 depicts an exemplary network environment wherein one or more embodiments of the present patent disclosure may be practiced for purposes of integrating an outgoing cellular call as an enterprise call.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, an exemplary network environment 100 is depicted wherein an embodiment of the present patent disclosure may be practiced for integrating an outgoing cellular call as an enterprise call. As depicted, the network environment 100 includes a generalized network infrastructure 102 wherein certain portions may form an enterprise network whereas the remaining portions may comprise an external network arrangement such as one or several service provider networks that serve as intermediary networks with respect to the enterprise network and the well-known PSTN/PLMN infrastructure 114. For purposes herein, an enterprise network may be any communications network internal to a company, office, or organization, and may comprise wireline and/or wireless network infrastructure. Regardless of the actual implementation, the network infrastructure 102 includes an integration server (also referred to as a Unified Communications Platform (UCP) element) 104, a switching element such as a SIP-capable Private Branch Exchange (PBX) 110 and a gateway (GW) element such as a SIP/PSTN GW 112. As alluded to previously, one or more of these elements may be incorporated within an enterprise network infrastructure in one embodiment. Alternatively, one or more of these elements or their functionalities may be hosted in a service provider network. In either arrangement, the functionalities of the elements may be integrated or redistributed into separate network entities. Accordingly, for purposes of the present patent disclosure, a "network node" may comprise a generalized network entity that effectuates or facilitates at least a portion of the functionalities set forth hereinbelow with respect to call integration.

An enterprise user is operable to effectuate communications (e.g., voice/data/video calls or multimedia sessions, and the like) in a number of scenarios within the context of the network environment 100 with respect to a called party 120. In general, the enterprise user is capable of initiating communications using one of two addresses: an enterprise address that may be used for calls made from within the enterprise network and a non-enterprise address for calls made from outside the enterprise network. In one application, the enterprise user may be provided with two separate pieces of user equipment (UE) 118: a wireline telephony equipment having the enterprise address that is used when the enterprise user is on the enterprise premises and a mobile communications device (MCD) having a cellular telephony number (i.e., non-enterprise address) that may be used when the enterprise user is away. Alternatively, where local wireless connectivity to the enterprise network is supported, a single wireless UE device operable in two different radio access technologies (RATs) may be provided. In this scenario, when the wireless UE device is attached to the enterprise network via any known or heretofore unknown Wireless Local Area Network (WLAN) technology, calls originated by the enterprise user may have the enterprise address as the calling party number. On the other hand, calls originated when the wireless UE device is attached to a wide area cellular network (WACN) such as the Public Land Mobile Network (PLMN) 114 may have the non-enterprise address (e.g., cellular telephony number) as the calling party number. Accordingly, it should be appreciated that the enterprise user equipment 118 may be a conventional cellular phone having data channel capability (e.g., Short Message Service or SMS capability) or a dual-mode MCD having WLAN capability (for enterprise operation) and WACN capability (for remote operation). Additionally, for purposes of further generalization, the enterprise UE device 118 may also comprise any personal computer (e.g., desktops, laptops, palmtops, personal digital assistants (PDAs) or other handheld computing devices) equipped with a suitable wireless modem, as well as a communications device operable in both circuit-switched (CS) and packet-switched (PS) communications that may even be capable of effectuating an inter-technology handoff between both CS and PS domains.

Based on the foregoing, it may be realized that the enterprise and non-enterprise addresses for an enterprise user may take on different forms, depending on the equipment and service provisioning. For instance, the enterprise address may comprise a SIP Uniform Resource Identifier (URI) or an E-164 number. Likewise, the non-enterprise address and the called party address may also comprise either SIP URIs, E.164 numbers, or other identifiers.

An enterprise data server 116 may be disposed in association with at least a portion of the network 102, preferably with the UCP node 104 when provisioned as part of an enterprise network. A data communications path 122 may be effectuated between the enterprise UE 118 and the enterprise network over the PLMN data network infrastructure via the enterprise data server 116. Regardless of whether integrated within an enterprise network or disposed in a service provider network, UCP node 104 preferably includes a Call Manager functionality 106 as well as a SIP Back-to-Back User Agent (B2BUA) 108 that is operable to perform third-party call control in order to combine multiple call legs together. In general, all enterprise SIP calls may be routed via the UCP node 104 and it is the role of the UCP node 104 to trigger the routing of the incoming SIP calls to the enterprise user regardless of whether UE 118 is attached via the enterprise WLAN or via the PLMN cellular network. Further, as will be described in detail below, the enterprise data server 116 can also receive a trigger message (i.e., a request to originate an outgoing cellular call) from UE 118 that is attached to the PLMN cellular network 114 via the cellular network's data network (such as GPRS or CDMA packet data network, for example) to request that the UCP node 104 establish a call between the enterprise UE 118 and the equipment 120 of the called party.

Figure 2:
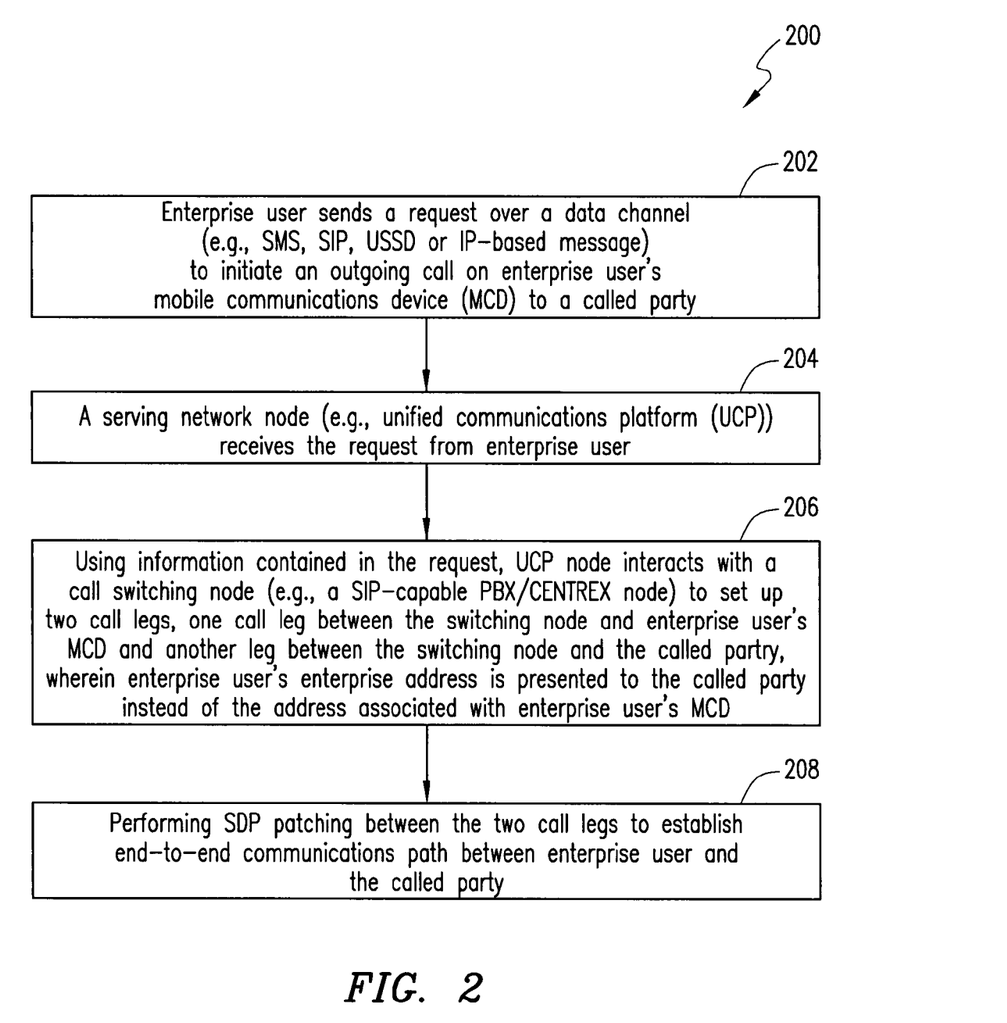
FIG. 2 depicts a flowchart of the present patent disclosure according to one embodiment.

Taking reference to FIGS. 1 and 2 together, a generalized scheme 200 for integrating outgoing calls from the enterprise UE 118 when it is attached to the cellular network may be set forth as follows. The enterprise user using its equipment sends a request message to a serving network node (i.e., the UCP element 104 shown in FIG. 1) via the cellular network's data network (block 202). Additionally or alternatively, the request message may also be mediated via an enterprise data server. In one embodiment, the request may comprise a SIP Request such as a SIP REFER message or some other SIP Request (e.g., a SIP INVITE message) either sent directly to the enterprise data server 116 via the cellular network's data network or routed to the UCP node 104 via the cellular network's SIP based infrastructure such as the IP Multimedia Subsystem (IMS). Alternatively, the message may not be a SIP Message at all and could be any message that contains the necessary information to enable the UCP node 104 to establish a call between the enterprise UE 118 and the called party's equipment 120 that the enterprise user is attempting to call (e.g., an SMS message, an Unstructured Supplementary Service Data (USSD) message, or an IP based message). In accordance with an embodiment, the following pieces of information may be transmitted as part of the request message: (i) the enterprise address (e.g., SIP URI or E.164 number) that the enterprise user is reachable at; (ii) the non-enterprise address (e.g., E.164 number) that the enterprise UE is reachable at when it is attached to the cellular network; (iii) the E.164 number or SIP URI of the called party; and (iv) an indication of whether privacy is required. Upon receiving the request message from the enterprise UE (block 204), the service logic at the UCP node 104 uses the received information to effectuate two call legs in association with a switching node such as a SIP-capable PBX/CENTREX node, a first call leg between the switching node and the enterprise UE and a second call leg between the called party's UE and the switching node wherein the enterprise user's enterprise address is presented to the called party instead of the non-enterprise address associated with the UE (i.e., the cellular number) (block 206). Thereafter, the first and second call legs are patched together wherein the two respective Session Description Protocol (SDP) streams associated with the call legs are joined in order to establish an end-to-end bearer communications path between the enterprise user and the called party (block 208).

Set forth below is an example of how a SIP REFER request can be used to trigger the UCP node 104 to establish an outgoing call within the context of the scheme described above:

TABLE I

REFER sip: IntegrationServer@companyXXX.com; SIP/2.0
Via: SIP/2.0/UDP PIN12345678.blackberry.com
    ;branch=z9hG4bKhjhs8ass83
Max-Forwards: 70
To: <sip: IntegrationServer@companyXXX.com>
From: Mike <sip:Mike@companyXXX.com>;tag=32331

TABLE I-continued

Call-ID: d432fa84b4c76e66710
Cseq: 2 REFER
Contact: <sip:PIN12345678.blackberry.com>
Refer-To: <cid:cn35t8jf02@companyXXX.com>
Require: multiple-refer
Content-Type: application/resource-lists+xml
Content-Disposition: recipient-list
Content-Length: 362
Content-ID: <cn35t8jf02@example.com>
<?xml version="1.0" encoding="UTF-8"?>
<resource-lists xmlns+"urn:ietf:params:xml:ns:resource-lists"
        Xmlns:xsi="http://www.w3.org/2001/XML.Schema-instance">
    <list>
    <entry uri="tel: 098-765-4321"/>
    <entry uri="tel: 123-456-7890"/>
    </list>
</resource-lists>

Those skilled in the art will recognize that the above SIP REFER request embodiment uses the Resource List mechanism defined in draft-ietf-sip-multiple-refer and draft-ietf-simple-xcap-list-user to trigger the sending of a SIP INVITE request towards both the enterprise UE 118 and the called party equipment 120 using the list entry uri elements to deliver both the E.164 number that the enterprise UE is reachable at via the cellular network and the E.164 number of the party being called. Accordingly, when the UCP node 104 receives the SIP REFER request or other trigger message, it uses SIP Third Party Call Control to establish two SIP Call legs; one SIP leg to the enterprise UE via the PBX, SIP-PSTN Gateway and the circuit-switched cellular network; the other SIP leg to the called party. As pointed out previously, these two call legs are joined together at the UCP node 104 in order to form a single end-to-end call between the enterprise user and the called party. The SIP INVITE requests sent contain the enterprise address of the enterprise UE terminal which can be in the form of SIP URI or as an E.164 number in a TEL URI along with the appropriate privacy setting if requested in the SIP REFER request. Alternatively, the privacy setting may be required by the enterprise network based on certain service provisioning policies and profiles. The enterprise address of the enterprise UE terminal can be transported in the SIP INVITE request using the SIP From header, Referred-By header, P-Asserted-Identity header, Identity header or Remote-Party-ID header. If a SIP URI is used as the enterprise address of the enterprise UE terminal, the SIP-PBX 110 may translate this address to the corresponding E.164 number that represents the enterprise address of the device. The SIP-PSTN GW 112 includes the E.164 number that represents the enterprise address of the enterprise UE terminal in the Calling Line Identity in the circuit-switched signaling messages.

Figure 3:
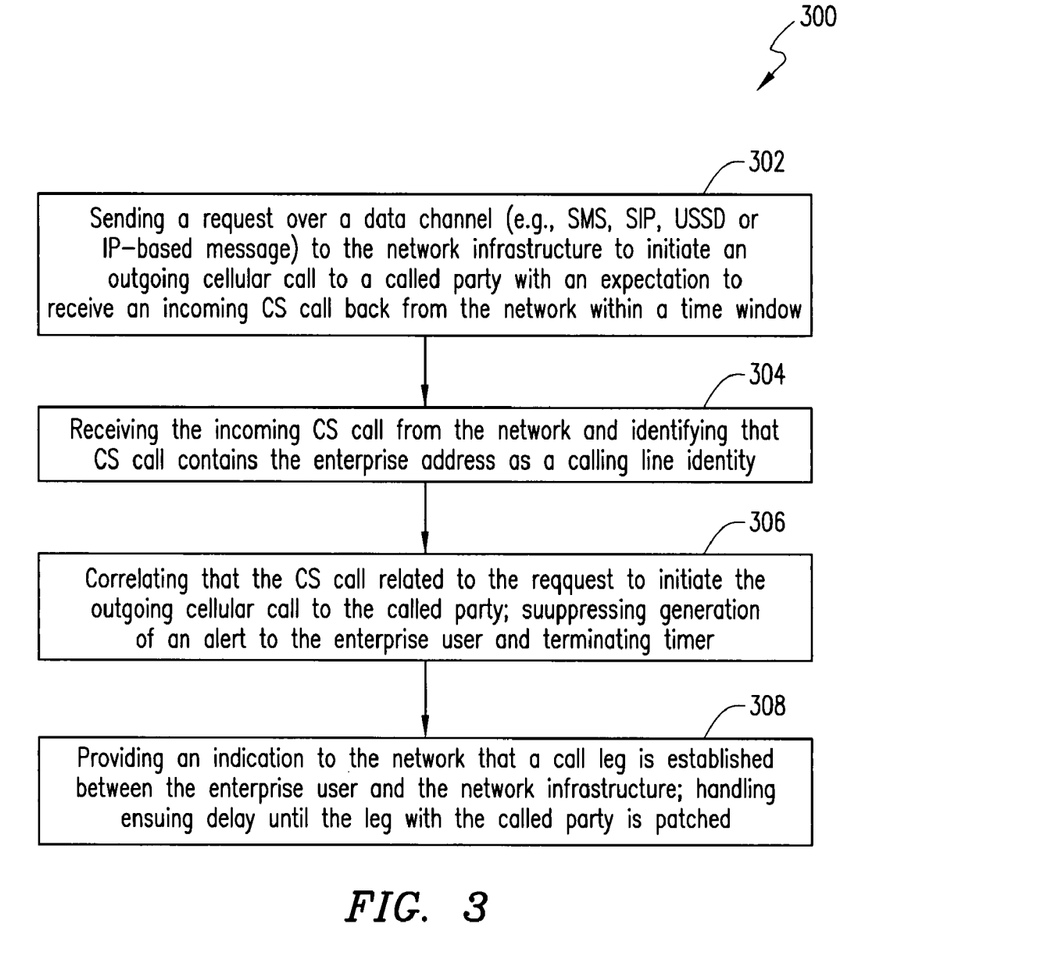
FIG. 3 depicts another flowchart of the present patent disclosure according to one embodiment.

With respect to the behavior of the enterprise UE for purposes of facilitating integration of an outgoing cellular call, reference may now be taken to FIG. 3 wherein a flowchart is depicted. When a request message for initiating an outgoing cellular call to a called party is transmitted to the network infrastructure, there is an expectation to receive an incoming circuit-switched call back from the network within a time window (block 302). Accordingly, a timer mechanism may be started at the application level to determine when to receive the circuit-switched call back in response to the outgoing request message. In one embodiment, if the timer expires, the enterprise UE device may try a number of times until a limit is reached, whereupon the call is considered to have failed. When the enterprise UE device receives a call establishment SETUP signaling request via the circuit-switched PSTN/

PMLN signaling, the logic executing on the device is operable to identify that the circuit-switched call contains the enterprise address as the Calling Line Identity (block 304) (that is, the Calling Line Identity in the SETUP is the enterprise UE's enterprise address), and based thereon, the logic determines that this incoming call is related to the requested outgoing call (requested via the SIP REFER request or other message) (block 306). Accordingly, the logic operates to suppress generation of an alert to the enterprise user but establishes the circuit-switched call and stops the application timer (block 306). Further, the enterprise UE may provide an indication to the network that the call leg has been established (block 308). Accordingly, in one embodiment, the UCP node may wait until it receives such an acknowledgement of the establishment of the call leg with the enterprise UE device before attempting to establish the call leg to the called user by sending an SIP INVITE request in order to avoid the possibility of the called party answering before the call leg with the enterprise UE device is established (i.e., avoidance of a race condition). In the meantime, until the call legs are patched, there may be a delay experienced at the enterprise UE from the time the circuit-switched call leg with the network is established. Appropriate delay handling mechanisms(s) may therefore be provided to mitigate the delay.

When the called party's equipment receives the circuit-switched SETUP message (or SIP INVITE request if the called party is using a SIP phone within the enterprise SIP network or an external SIP network), the Calling Line Identity in the case of the circuit-switched SETUP message (or From header, Referred-By header, P-Asserted-Identity header, Identity header or Remote-Party-ID header in the case of SIP INVITE message) contains the enterprise address (e.g., E.164 number or SIP URI) of the enterprise UE device to be presented to the called party for Calling Line Identity Presentation (if provided based on the privacy setting). The called phone rings the user and returns an ALERTING message in the case of a circuit-switched call (or a SIP 180 "Ringing" response in the case of a SIP call). An ALERTING message will be translated by the SIP-PSTN gateway to a SIP 180 "Ringing" response. When the SIP 180 "Ringing" response is received at the UCP node, the service logic operable thereat may send a notification of "Ringing" back to the enterprise UE terminal via the cellular network's data network. In the case that the call establishment was triggered using a SIP REFER request, this notification may be in the form of a SIP NOTIFY request as specified in RFC 3515. In the case a message other than a SIP REFER request was used, the notification of "Ringing" may be sent using some other message. It is necessary to use the connection via the cellular network's data network to notify the "Ringing" since the call leg that is established with the enterprise UE terminal via the circuit-switched network is "in the wrong direction" to be able to indicate ALERTING using the circuit-switched signaling protocol.

Upon answering by the enterprise user, the UE terminal sends the circuit-switched CONNECT message (or SIP 200 "OK" response if the called party is using a SIP phone within the enterprise SIP network or an external SIP network). A CONNECT message will be translated by the SIP-PSTN GW to a SIP 200 "OK" response. When the SIP 200 "OK" response is received at the UCP node 104, it can send a notification of "OK" back to the enterprise UE terminal via the cellular network's data network. In the case that the call establishment was triggered using a SIP REFER request, this notification will be in the form of a SIP NOTIFY request as specified in RFC 3515. In the case a message other than a SIP REFER request was used, the notification of "OK" may be sent using some other message. At this point the call is established via the cellular network between the enterprise UE terminal and the called party, with the enterprise address of the enterprise UE terminal being displayed as the identity of the calling party.

Figure 4:
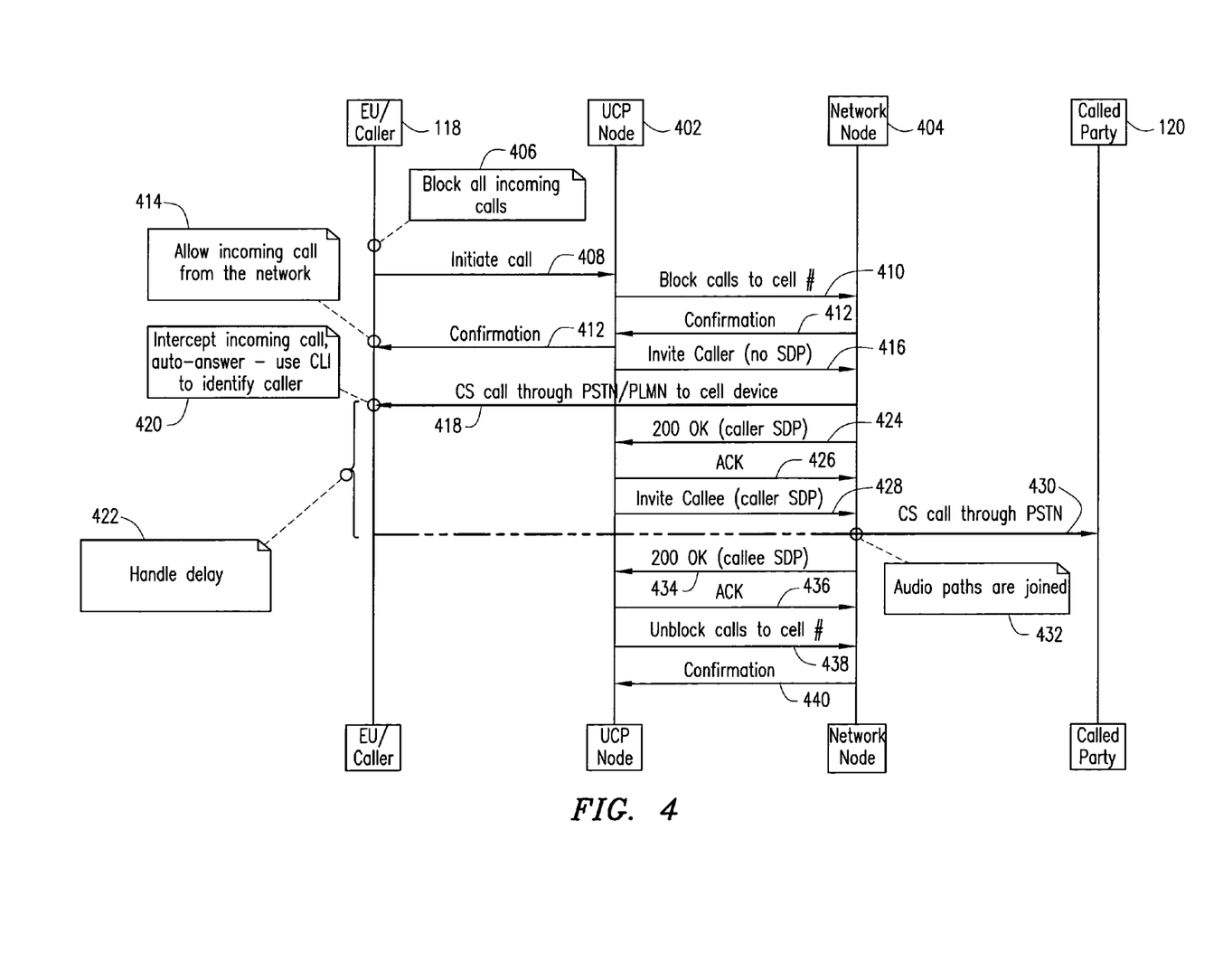
FIG. 4 depicts an exemplary message flow diagram according to one embodiment of the present patent disclosure.

FIG. 4 depicts an exemplary message flow diagram according to an embodiment of the process set forth above. As illustrated, a UCP node 402 and a network node 404 are exemplified to highlight the message flow between the enterprise UE 118 and the network infrastructure in particular detail. Upon blocking all incoming calls to the enterprise UE 118 (block 406), a request with respect to an outgoing call is initiated (reference numeral 408). In response, the UCP node 402 sends a message to the network node 404 (e.g., SIP-PBX) to block calls to the enterprise UE 118. A confirmation 412 is then propagated from the network node 404 to enterprise UE 118 via the UCP node 412, whereupon incoming calls from the network may be allowed (block 414). The UCP node 402 transmits a message 416 to the network node 404 to invite the enterprise user (i.e., caller) with respect to establishing a CS call 418 through the cellular network to the enterprise UE 118. Service logic at the enterprise UE 118 is operable to intercept the incoming CS call setup and identify that the enterprise address of the enterprise user is the CLI (block 420). Thereafter, a SIP 200 "OK" message 424 is generated by the network node 404 towards the UCP node 402 with respect to caller SDP. In response, an acknowledgement (ACK) 426 is generated by the UCP node 402. The UCP node 402 also generates a message 428 towards the network node 404 to invite the called party (i.e., callee) with respect to establishing a CS call 430 therewith through the PSTN/PLMN. As shown in block 422, appropriate service logic may be provided for handling the delay before patching the call legs. Pursuant to joining the audio paths (block 432), a SIP 200 "OK" message 434 is generated by the network node 404 towards the UCP node 402 with respect to callee SDP. In response, an acknowledgement (ACK) 436 is generated by the UCP node 402. A message 438 is provided thereafter by the UCP node 402 to the network node 404 in order to unblock calls to the enterprise UE 118, resulting in a confirmation 440 by the network node 404. It should be appreciated that the various operations set forth herein may be accomplished via a number of means, including software (e.g., program code), firmware, hardware, or in any combination, usually in association with a processing system. Where the processes are embodied in software, such software may comprise program instructions that form a computer program product, uploadable service application software, or software downloadable from a remote station, and the like.

Figure 5:
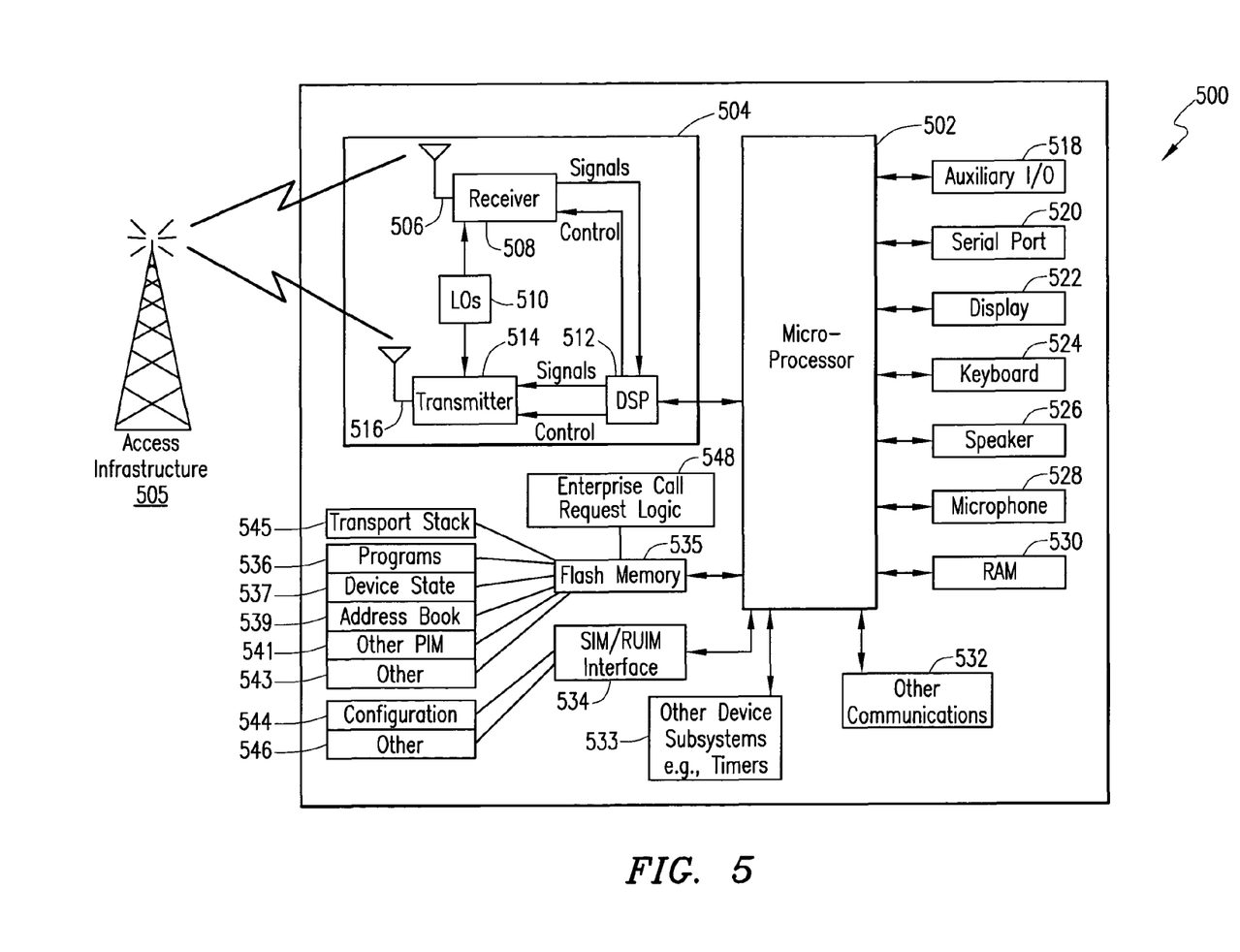
FIG. 5 depicts a block diagram of an embodiment of a communications device operable for purposes of the present patent disclosure.

FIG. 5 depicts a block diagram of an embodiment of a communications device 500 operable as a UE device, e.g., the enterprise UE 118, for purposes of the present patent disclosure. It will be recognized by those skilled in the art upon reference hereto that although an embodiment of UE 118 may comprise an arrangement similar to one shown in FIG. 5, there can be a number of variations and modifications, in hardware, software or firmware, with respect to the various modules depicted. Further, a UE device 500 for purposes of the present disclosure may comprise a mobile equipment (ME) device without a removable storage module and/or a mobile device coupled with such a storage module. Accordingly, the arrangement of FIG. 5 should be taken as illustrative rather than limiting with respect to the embodiments of the present patent disclosure. A microprocessor 502 providing for the overall control of an embodiment of UE 500 is operably coupled to a communication subsystem 504 that may preferably be capable of multi-mode communications (e.g., CS domain and PS domain). The communication subsystem 504 generally includes one or more receivers 508 and one or more transmitters 514 as well as associated components such as one or more local oscillator (LO) modules 510 and a processing module such as a digital signal processor (DSP) 512. As will be apparent to those skilled in the field of communications, the particular design of the communication module 504 may be dependent upon the communications networks with which the mobile device is intended to operate (e.g., a CDMA network, a GSM network, WLAN, et cetera). Regardless of the particular design, however, signals received by antenna 506 through appropriate access infrastructure 505 (e.g., cellular base station towers, WLAN hot spots, etc.) are provided to receiver 508, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 512, and provided to transmitter 514 for digital-to-analog (D/A) conversion, frequency up conversion, filtering, amplification and transmission over the air-radio interface via antenna 516.

Microprocessor 502 may also interface with further device subsystems such as auxiliary input/output (I/O) 518, serial port 520, display 522, keyboard/keypad 524, speaker 526, microphone 528, random access memory (RAM) 530, a short-range communications subsystem 532, and any other device subsystems, e.g., timer mechanisms, generally labeled as reference numeral 533. To control access, a USIM/RUIM interface 534 may also be provided in communication with the microprocessor 602. In one implementation, USIM/RUIM interface 534 is operable with a USIM/RUIM card having a number of key configurations 544 and other information 546 such as identification and subscriber-related data.

Operating system software and applicable service logic software may be embodied in a persistent storage module (i.e., non-volatile storage) such as Flash memory 535. In one implementation, Flash memory 535 may be segregated into different areas, e.g., storage area for computer programs 536 (e.g., service processing logic), as well as data storage regions such as device state 537, address book 539, other personal information manager (PIM) data 541, and other data storage areas generally labeled as reference numeral 543. A transport stack 545 may be provided to effectuate one or more appropriate radio-packet transport protocols. In addition, enterprise call request messaging logic 548, including memory storage for storing pertinent address information, is provided for facilitating integration of outgoing calls as set forth hereinabove.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method, operable on a wireless user equipment (UE) device, for facilitating integration of an outgoing cellular call as an enterprise call, wherein said outgoing cellular call is originated by an enterprise user towards a called party when said enterprise user is attached to an external wide area cellular network via a mobile communications device, said enterprise user having an enterprise address and a non-enterprise address, comprising:

upon blocking all incoming calls to the UE device, sending a data request to a network node in a data network for initiating said outgoing cellular call to said called party with an expectation to receive an incoming circuit-switched call back from said network node within a time window;

if said time window has elapsed without receiving said incoming circuit-switched call from said network node, continuing to send said request a select number of times;

else, receiving said incoming circuit-switched call from said network node, said incoming call containing said enterprise address as a calling line identity to identify that said incoming circuit-switched call is related to said request to initiate origination of said outgoing cellular call; and providing an indication to said network node that a call leg is established between said enterprise user and said network node.

2. The method as recited in claim 1, wherein said data request is sent as a Short Message Service (SMS) message.

3. The method as recited in claim 1, wherein said data request is sent as an Unstructured Supplementary Service Data (USSD)-based message.

4. The method as recited in claim 1, wherein said data request is sent as a Session Initiation Protocol (SIP) message.

5. The method as recited in claim 4, wherein said SIP message comprises a SIP INVITE message.

6. The method as recited in claim 4, wherein said SIP message comprises a SIP REFER message.

7. The method as recited in claim 1, wherein said data request is sent as an Internet Protocol (IP)-based message.

8. The method as recited in claim 1, wherein said data request includes said enterprise address, said non-enterprise address, said called party's address, and a privacy indication.

9. The method as recited in claim 8, wherein said enterprise address comprises one of a SIP Uniform Resource Identifier (URI) and an E-164 number.

10. The method as recited in claim 8, wherein said non-enterprise address comprises a cellular telephony network number in E-164 format.

11. The method as recited in claim 8, wherein said called party's address comprises one of a SIP Uniform Resource Identifier (URI) and an E-164 number.

12. The method as recited in claim 1, wherein said time window is effectuated based on commencing a timer with respect to sending said request.

13. The method as recited in claim 12, wherein said timer is terminated upon receipt of said incoming circuit-switched call from said network node.

14. A user equipment (UE) device operable to generate an outgoing cellular call as an enterprise call, wherein said outgoing cellular call is originated by an enterprise user towards a called party when said UE device is attached to an external wide area cellular network, said enterprise user having an enterprise address and a non-enterprise address, comprising:

means for sending a data request to a network node in a data network to initiate origination of said outgoing cellular call to said called party with an expectation to receive an incoming circuit-switched call back from said network node within a time window and for continuing to send said request a select number of times if said time window has elapsed without receiving said incoming circuit-switched call from said network node, said request being sent upon blocking all incoming calls to the UE device; and means for receiving said incoming circuit-switched call from said network node, said incoming call containing said enterprise address as a calling line identity to identify that said incoming circuit-switched call is related to said request to initiate origination of said outgoing cellular call.

15. The UE device as recited in claim 14, further comprising means for providing an indication to said network node that a call leg is established between said UE device and said network node.

16. The UE device as recited in claim 14, further comprising means for disabling incoming calls to said UE device, said means for disabling being operable upon sending said request.

\* \* \* \* \*